(12) United States Patent
Omran et al.

(10) Patent No.: US 12,518,933 B1
(45) Date of Patent: Jan. 6, 2026

(54) ELECTROCHEMICAL DEVICE BASED ON $CaV_2O_6/CaSiO_3/g\text{-}C_3N_4$ NANOCOMPOSITE

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA); Khaled Faisal Mahmoud Qasim, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/266,148

(22) Filed: Jul. 10, 2025

(51) Int. Cl.
*H01G 11/46* (2013.01)
*H01G 11/38* (2013.01)
*H01G 11/62* (2013.01)

(52) U.S. Cl.
CPC ............ *H01G 11/46* (2013.01); *H01G 11/38* (2013.01); *H01G 11/62* (2013.01)

(58) Field of Classification Search
None
See application file for complete search history.

(56) References Cited

U.S. PATENT DOCUMENTS

| | | | | |
|---|---|---|---|---|
| 6,322,928 | B1 * | 11/2001 | Thackeray | C01G 31/006 252/182.1 |
| 2021/0234154 | A1 * | 7/2021 | Wang | H01M 10/052 |
| 2024/0309526 | A1 | 9/2024 | Mohamed et al. | |

FOREIGN PATENT DOCUMENTS

| | | |
|---|---|---|
| CN | 106435635 B | 4/2019 |
| CN | 110323066 A | 10/2019 |
| CN | 118645376 B | 11/2024 |

OTHER PUBLICATIONS

Jin You Zheng, et al., "Preparation of $C_3N_4$ Thin Films for Photo-/Electrocatalytic $CO_2$ Reduction to Produce Liquid Hydrocarbons", Catalysts, vol. 12, Issue 11, Article 1399, Nov. 9, 2022 (15 pgs).
Juan Wang, et al., "Modification of $TiO_2$ nanorod arrays by graphite-like $C_3N_4$ with high visible light photoelectrochemical activity", Electrochimica Acta, vol. 71, Jun. 1, 2012, pp. 10-16 (excerpts).
M. Mouyane, et al., "Tin dispersed in an oxide matrix as negative electrode material for Li-ion batteries", Journal of Power Sources, vol. 189, Issue 1, Apr. 1, 2009, pp. 818-822 (excerpts).

* cited by examiner

*Primary Examiner* — Eric W Thomas
(74) *Attorney, Agent, or Firm* — Oblon, McClelland, Maier & Neustadt, L.L.P.

(57) ABSTRACT

An electrochemical device includes a counter electrode, a reference electrode, a working electrode, and an electrolyte. The working electrode is a fluorine-doped tin oxide electrode with a graphite-phase carbon nitride calcium metavanadate and calcium silicate ($CaV_2O_6/CaSiO_3/g\text{-}C_3N_4$) nanocomposite, a binder, and a black carbon mixture on a surface of the fluorine-doped tin oxide electrode. The $CaV_2O_6/CaSiO_3/g\text{-}C_3N_4$ nanocomposite includes a graphite-phase carbon nitride ($g\text{-}C_3N_4$) in an amount of 20 to 40 percent by weight (wt. %), calcium metavanadate ($CaV_2O_6$) in an amount of 20 to 40 wt. %, and a calcium silicate ($CaSiO_3$) in an amount of 20 to 40 wt. % based on a total weight of the $CaV_2O_6/CaSiO_3/g\text{-}C_3N_4$ nanocomposite.

19 Claims, 5 Drawing Sheets

ELECTROCHEMICAL DEVICE BASED ON CaV$_2$O$_6$/CaSiO$_3$/g-C$_3$N$_4$ NANOCOMPOSITE

BACKGROUND

Technical Field

The present disclosure is directed to an electrochemical device; more particularly, to an electrochemical device that incorporates a nanohybrid having enhanced performance as a supercapacitor and energy storage system, a method of making the device and a method of using the device.

Description of Related Art

The 'background' description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

The increasing depletion of fossil fuels and the escalating threat of global warming have underscored the urgent need for clean, efficient, and sustainable energy sources. In response, there has been a significant surge in research and development of advanced energy storage technologies, particularly supercapacitors (SCs), which offer high power density, long cycle life, and safe operation. SCs are primarily categorized into two types based on their charge storage mechanisms: electric double-layer capacitors (EDLCs) and Pseudo capacitors (PCs).

Traditional EDLCs utilize carbon-based materials such as activated carbon, graphene, and carbon nanotubes, which provide high surface area and good conductivity. However, their energy density is limited due to the purely non-Faradaic charge storage mechanism. On the other hand, PCs employ transition metal oxides (TMOs) such as MnO$_2$, RuO$_2$, and SnO$_2$, which contribute to higher energy densities through Faradaic redox reactions. Despite their advantages, TMOs often suffer from poor conductivity, low stability, and limited availability, which hinder their practical applications.

Accordingly, it is an object of the present disclosure to provide an efficient composite material synthesized through a facile and scalable method, and incorporate it in a electrochemical device thereby overcoming the limitations of the prior art.

SUMMARY

In an exemplary embodiment, an electrochemical device is described. The electrochemical device includes a counter electrode, a reference electrode, a working electrode, and an electrolyte. The working electrode is a fluorine-doped tin oxide electrode with a graphite-phase carbon nitride calcium metavanadate and calcium silicate (CaV$_2$O$_6$/CaSiO$_3$/g-C$_3$N$_4$) nanocomposite, a binder, and a black carbon mixture on a surface of the fluorine-doped tin oxide electrode. The CaV$_2$O$_6$/CaSiO$_3$/g-C$_3$N$_4$ nanocomposite includes a graphite-phase carbon nitride (g-C$_3$N$_4$) in an amount of 20 to 40 percent by weight (wt. %), calcium metavanadate (CaV$_2$O$_6$) in an amount of 20 to 40 wt. %, and a calcium silicate (CaSiO$_3$) in an amount of 20 to 40 wt. % based on a total weight of the CaV$_2$O$_6$/CaSiO$_3$/g-C$_3$N$_4$ nanocomposite.

In some embodiments, the working electrode includes 80 to 90 wt. % of the CaV$_2$O$_6$/CaSiO$_3$/g-C$_3$N$_4$ nanocomposite, 2 to 10 wt. % of the binder, and 5 to 15 wt. % of the black carbon.

In some embodiments, the binder is poly(vinylidene fluoride) (PVDF).

In some embodiments, the working electrode has a redox potential of +0.45 to +0.55 volts (V).

In some embodiments, the working electrode has a specific capacity of 190 to 210 faraday per gram (F/g) of the CaV$_2$O$_6$/CaSiO$_3$/g-C$_3$N$_4$ nanocomposite at a scan rate of 1 millivolts per second (mV/s).

In some embodiments, the working electrode has a specific capacity of 155 to 175 F/g of the CaV$_2$O$_6$/CaSiO$_3$/g-C$_3$N$_4$ nanocomposite at a scan rate of 0.25 mV/s.

In some embodiments, the working electrode has an energy density of 20 to 25 watt-hour per gram (Wh/g) of the CaV$_2$O$_6$/CaSiO$_3$/g-C$_3$N$_4$ nanocomposite.

In some embodiments, the working electrode has a power density of 200 to 220 watts per kilogram (W/kg) of the CaV$_2$O$_6$/CaSiO$_3$/g-C$_3$N$_4$ nanocomposite.

In some embodiments, the working electrode has a solution resistance of 20 to 30 ohm ($\Omega$).

In some embodiments, the working electrode has a charge transfer resistance of 900 to 1000$\Omega$.

In some embodiments, the working electrode has a conductivity of 0.030 to 0.035 milli siemens per square centimetre (mS/cm$^2$).

In some embodiments, the working electrode has a time constant of 0.011 to 0.013 milliseconds (ms).

In some embodiments, the working electrode has at least 80% of the capacity retention after 1000 cycles.

In some embodiments, the CaV$_2$O$_6$/CaSiO$_3$/g-C$_3$N$_4$ nanocomposite includes a graphite-phase carbon nitride (g-C$_3$N$_4$) in an amount of 25 to 35 percent by weight (wt. %), calcium metavanadate (CaV$_2$O$_6$) in an amount of 25 to 35 wt. %, and a calcium silicate (CaSiO$_3$) in an amount of 25 to 35 wt. % based on a total weight of the CaV$_2$O$_6$/CaSiO$_3$/g-C$_3$N$_4$ nanocomposite.

In some embodiments, the counter electrode is at least one selecting from the group consisting of platinum, gold, and graphite.

In some embodiments, the reference electrode is at least one selecting from the group consisting of standard hydrogen electrode, silver/silver chloride electrode (Ag/AgCl), and saturated calomel electrode (Hg/Hg$_2$Cl$_2$).

In some embodiments, the electrolyte is a salt solution. The electrolyte includes at least one cation selecting from the group of sodium, potassium, calcium, magnesium, and at least one anion selecting from the group of hydroxide, chloride, phosphate, and bicarbonate.

In some embodiments, the electrochemical device further includes drying the CaV$_2$O$_6$/CaSiO$_3$/g-C$_3$N$_4$ nanocomposite, binder, and black carbon mixture on the fluorine-doped tin oxide electrode at 150 to 250° C. for 1 to 5 hours.

In some embodiments, the CaV$_2$O$_6$/CaSiO$_3$/g-C$_3$N$_4$ nanocomposite, binder, and black carbon mixture is in an amount of 10 to 30 mg/cm$^2$ of the fluorine-doped tin oxide electrode.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
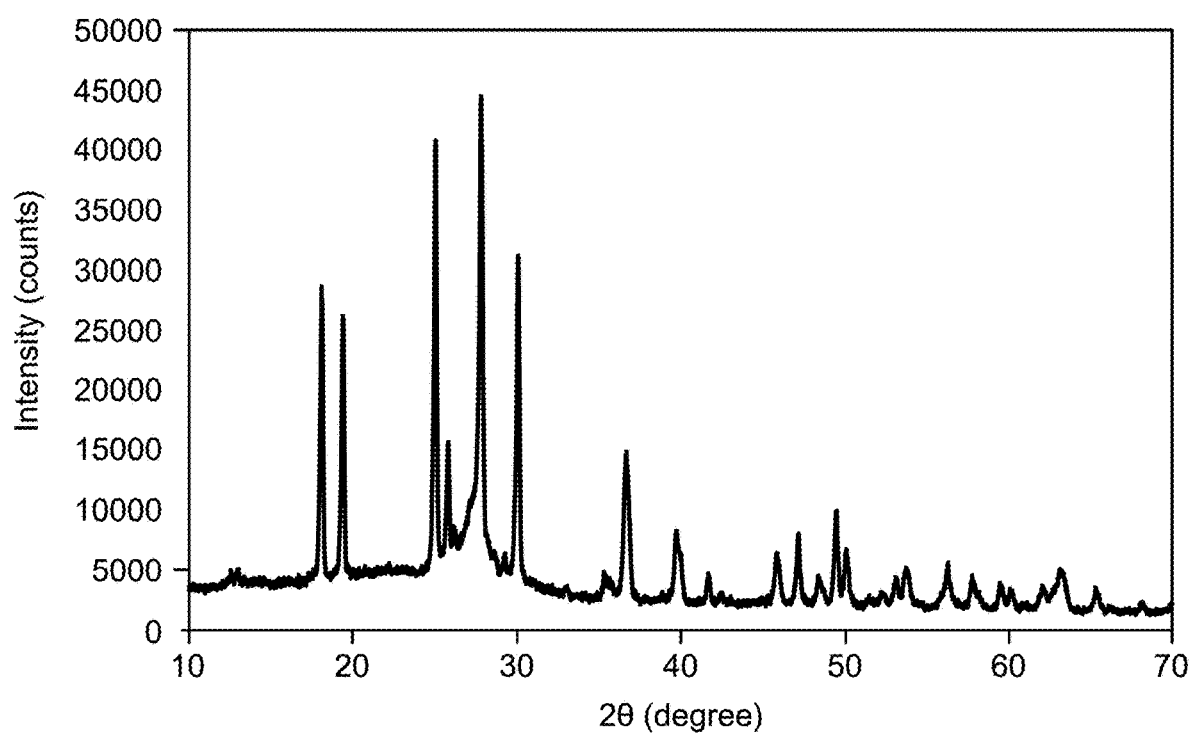
FIG. 1 is an X-ray diffraction (XRD) diffractogram of $CaV_2O_6/CaSiO_3/g-C_3N_4$ nanocomposite, according to certain embodiments.

When describing the present disclosure, the terms used are to be construed in accordance with the following definitions, unless a context dictates otherwise.

Embodiments of the present invention will now be described more fully hereinafter with reference to the accompanying drawings, wherever applicable, in that some, but not all, embodiments of the disclosure are shown.

In the drawings, like reference numerals designate identical or corresponding parts throughout the several views. Further, as used herein, the words 'a', 'an', and the like generally carry a meaning of 'one or more', unless stated otherwise.

Furthermore, the terms 'approximately', 'approximate', 'about', and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value end point.

As used herein, the term 'amount' refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A wt. % of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopes of nitrogen include $^{14}N$ and $^{15}N$. Isotopes of hydrogen include $^{1}H$, $^{2}H$, and $^{3}H$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'room temperature' refers to a temperature range of '25 degrees Celsius (° C.)±3° C. in the present disclosure.

As used herein, the term 'electrochemical device' refers to a system that converts chemical energy into electrical energy or vice versa, typically involving redox reactions at electrodes, preferably in a container such as an electrochemical cell.

As used herein, the term 'redox potential' refers to the measure of a substance's tendency to gain or lose electrons, indicating its ability to undergo reduction or oxidation reactions.

As used herein, the term 'specific capacity' refers to the amount of charge a material can store per unit mass, usually expressed in ampere-hours per gram.

As used herein, the term 'energy density' refers to the amount of energy stored per unit volume or mass of a substance, indicating how much energy can be stored in a given space or weight.

As used herein, the term 'power density' refers to the rate at which energy can be delivered per unit volume or mass, indicating how quickly energy can be supplied by a system.

As used herein, the term 'solution resistance' refers to the opposition to the flow of electric current within the electrolyte solution, affecting the overall performance of electrochemical devices.

As used herein, the term 'charge transfer resistance' refers to the resistance encountered when electrons are transferred between an electrode and an electrolyte, influencing the efficiency of electrochemical reactions.

As used herein, the term 'conductivity' refers to the ability of a material to conduct electric current, inversely related to resistance.

As used herein, the term 'time constant' refers to the time required for the charge or discharge process in an RC circuit to reach approximately 63.2% of its total change, indicating the speed of response.

As used herein, the term 'capacity retention' refers to the ability of an energy storage device to maintain its capacity over multiple charge-discharge cycles, reflecting its long-term stability.

As used herein, the term 'supercapacitor' refers to an electrochemical capacitor with a high capacitance value, capable of storing a large amount of energy and delivering rapid bursts of power, bridging the gap between conventional capacitors and rechargeable batteries.

As used herein, the term 'battery' is an electrochemical device that stores and provides electrical energy through chemical reactions. It comprises one or more electrochemical cells, each containing a positive electrode (cathode), a negative electrode (anode), and an electrolyte that allows the movement of ions. When a battery is connected to an external circuit, a chemical reaction occurs between the electrodes and the electrolyte, generating a flow of electrons through the circuit, which powers electrical devices.

As used herein, the term 'electrode' refers to an electrical conductor that contacts a non-metallic part of a circuit, e.g., a semiconductor, an electrolyte, a vacuum, or air. The supercapacitor includes a negative electrode and a positive electrode. The negative electrode and the positive electrode are collectively referred to as the electrodes unless otherwise specifically mentioned. As used herein, the term 'electrolyte' is a substance that forms a solution that can conduct electricity when dissolved in a polar solvent. In an embodiment, the electrolyte is an aqueous solution.

Aspects of the present disclosure are directed to a nanocomposite including calcium vanadate, calcium silicate, and graphitic carbon nitride in a mass ratio of approximately 0.8-1.2:0.8-1.2:0.8-1.2, synthesized through a simple, cost-effective process. In some embodiments, the mass ratio of calcium vanadate, calcium silicate, and graphitic carbon nitride is in the range of 0.8-1.2:0.8-1.2:0.8-1.2, and preferably 0.9-1.1:0.9-1.1:0.9:1.1. In a preferred embodiment, the mass ratio of calcium vanadate, calcium silicate, and graphitic carbon nitride is 1:1:1. The composite demonstrated enhanced electrochemical performance, exhibiting improved power and energy densities, indicative of its potential as an efficient material for energy storage applications.

In the present disclosure an electrochemical device is described. The electrochemical device includes a counter electrode, a reference electrode, a working electrode, and an electrolyte, preferably disposed in an electrochemical cell or container. As used herein, the term 'reference electrode' refers to an electrode with a stable and well-known electrode potential. In some embodiments, the reference electrode is at least one selecting from the group consisting of standard hydrogen electrode, silver/silver chloride electrode (Ag/AgCl), and saturated calomel electrode ($Hg/Hg_2Cl_2$). In a preferred embodiment, the reference electrode is saturated calomel electrode ($Hg/Hg_2Cl_2$). In some embodiments, the reference electrode may include, but is not limited to, standard hydrogen electrode (SHE), calomel electrode (saturated calomel electrode, SCE), copper/copper sulfate electrode ($Cu/CuSO_4$), standard calomel electrode (SCE), Luggin capillary. The counter-electrode refers to the electrode used in an electrochemical cell for voltametric analysis or other reactions in which an electric current is expected to flow. An outer surface of the counter electrode may include an inert, electrically conducting chemical substance, such as platinum, gold, or carbon. The carbon may be in the form of graphite or glassy carbon. In some embodiments, the counter electrode is at least one selecting from the group of platinum, gold, and graphite. In a preferred embodiment, the counter electrode is a platinum rod. In one embodiment, the counter electrode may be a wire, a rod, a cylinder, a tube, a scroll, a sheet, a piece of foil, a woven mesh, a perforated sheet, or a brush. The counter electrode material should thus be sufficiently inert to withstand the chemical conditions in the electrolyte solution, such as acidic or basic pH values, without substantially degrading during the electrochemical reaction. In addition, the counter electrode should preferably not leach out any chemical substance that interferes with the electrochemical reaction or might lead to undesirable electrode contamination. In some embodiments, the reference electrode and the counter-electrode may be connected through electrical interconnects that allow for the passage of current between the electrodes when a potential is applied between them. In an embodiment, the reference electrode and the counter-electrode can have the same or different dimensions. The reference electrode and the counter-electrode may be arranged by a person of ordinary skill in the art.

In some embodiments, the electrolyte is a salt solution. The electrolyte includes at least one cation selecting from the group of sodium, potassium, calcium, magnesium, and at least one anion selecting from the group of hydroxide, chloride, phosphate, and bicarbonate. In some embodiments, the electrolyte is a redox electrolyte. In some embodiments, the electrolyte includes an acid. In some embodiments, the electrolyte consists of a solvent. In some embodiments, the electrolyte includes an acid and a solvent. In some embodiments, the acid is a strong acid. Suitable examples of the acid include, perchloric acid, hydroiodic acid, hydrobromic acid, hydrochloric acid, sulfuric acid, p-toluenesulfonic acid, methanesulfonic acid, or any combination thereof. In some embodiments, the solvent includes tetrahydrofuran, ethyl acetate, dimethylformamide, acetonitrile, acetone, dimethyl sulfoxide, nitromethane, propylene carbonate, ethanol, formic acid, n-butanol, methanol, acetic acid, water, or any combination thereof. The electrolyte is selected from hydrochloric acid, nitric acid, sulfuric acid, hydrobromic acid, hydroiodic acid, and perchloric acid. In some embodiments, examples of bases used as the electrolyte may include sodium hydroxide, potassium hydroxide, calcium hydroxide, magnesium hydroxide, and ammonia. In a preferred embodiment, the electrolyte is sodium hydroxide.

The working electrode refers to the electrode in an electrochemical cell/device/sensor on which the electrochemical reaction of interest is occurring. The working electrode is a fluorine-doped tin oxide electrode with a graphite-phase carbon nitride calcium metavanadate and calcium silicate ($CaV_2O_6/CaSiO_3/g-C_3N_4$) nanocomposite, a binder, and a black carbon mixture on a surface of the fluorine-doped tin oxide electrode. In some embodiments, the fluorine-doped tin oxide electrode may be replaced by a tin doped indium oxide (ITO) coated glass electrode, an aluminum doped zinc oxide (AZO) coated glass electrode, a niobium doped titanium dioxide (NTO) coated glass electrode, an indium doped cadmium oxide (ICO) coated glass electrode, an indium doped zinc oxide (IZO) coated glass electrode, a fluorine doped zinc oxide (FZO) coated glass electrode, a gallium doped zinc oxide (GZO) coated glass electrode, an antimony doped tin oxide (ATO) coated glass electrode, a phosphorus doped tin oxide (PTO) coated glass electrode, a zinc antimonate coated glass electrode, a zinc oxide coated glass electrode, a ruthenium oxide coated glass electrode, a rhenium oxide coated glass electrode, a silver oxide coated glass electrode, and a nickel oxide coated glass electrode. In some embodiments, elements such as Ni, Al, Cu, Fe, Ag, Zn, Sn, Sb, Ti, In, V, Cr, Co, C, Ca, Mo, Au, P, W, Rh, Mn, B, Si Ge, Se, Ln, Ga, Ir, and an alloy or a mixture of two or more of the substance, may be disposed on the surface of the transparent electrode.

As used herein, the term 'binder' refers to the binding material responsible for holding the active material particles within the electrode together to maintain a strong connection between the electrode and contacts. Such binding materials are normally inert and have an important role in the manufacturability of the battery. In some embodiments, the binder may include but are not limited to poly(vinylidene fluoride) (PVDF) and N-methyl pyrrolidone (NMP). In some embodiments, the binder may include, but is not limited to, manganese dioxide ($MnO_2$), nickel hydroxide [$Ni(OH)_2$], hydrogen storage alloy, lithium cobalt dioxide ($LiCoO_2$), lithium nickel dioxide ($LiNiO_2$), lithium manganese dioxide ($LiMnO_2$), carbon, graphite, an ethylene propylene diene monomer (EPDM). In some embodiments, the binder is polyvinylidene fluoride (PVDF).

The $CaV_2O_6/CaSiO_3/g-C_3N_4$ nanocomposite includes a graphite-phase carbon nitride ($g-C_3N_4$) in an amount of 20 to 40 percent by weight (wt. %), calcium metavanadate ($CaV_2O_6$) in an amount of 20 to 40 wt. %, and a calcium silicate ($CaSiO_3$) in an amount of 20 to 40 wt. % based on a total weight of the $CaV_2O_6/CaSiO_3/g-C_3N_4$ nanocomposite. In some embodiments, the $CaV_2O_6/CaSiO_3/g-C_3N_4$ nanocomposite includes a graphite-phase carbon nitride ($g-C_3N_4$) in an amount of 25 to 35 percent by weight (wt. %), calcium metavanadate ($CaV_2O_6$) in an amount of 25 to 35 wt. %, and a calcium silicate ($CaSiO_3$) in an amount of 25 to 35 wt. % based on a total weight of the $CaV_2O_6/CasiO_3/g-C_3N_4$ nanocomposite.

In some embodiments, the working electrode includes 80 to 90 wt. %, preferably 80.5 to 89.5 wt. %, preferably 81 to 89 wt. %, preferably 81.5 to 88.5 wt. %, preferably 82 to 88 wt. %, preferably 82.5 to 87.5 wt. %, preferably 83 to 87 wt. %, preferably 83.5 to 86.5 wt. %, preferably 84 to 86 wt. %, preferably 84.5 to 85.5 wt. %, preferably 85 wt. % of the $CaV_2O_6/CasiO_3/g-C_3N_4$ nanocomposite, 2 to 10 wt. %, preferably 2.5 to 9.5 wt. %, preferably 3 to 9 wt. %, preferably 3.5 to 8.5 wt. %, preferably 4 to 8 wt. %, preferably 4.5 to 7.5 wt. %, preferably 5 wt. % of the binder, and 5 to 15 wt. %, preferably 5.5 to 14.5 wt. %, preferably 6 to 14 wt. %, preferably 6.5 to 13.5 wt. %, preferably 7 to 13 wt. %, preferably 7.5 to 12.5 wt. %, preferably 8 to 12 wt. %, preferably 8.5 to 11.5 wt. %, preferably 9 to 11 wt. %, preferably 9.5 to 10.5 wt. %, preferably 10 wt. % of the black carbon.

In some embodiments, the working electrode has a redox potential of +0.45 to +0.55 volts (V), preferably +0.48 to +0.52 V. In some embodiments, the working electrode has a specific capacity of 190 to 210 faraday per gram (F/g) of the $CaV_2O_6/CaSiO_3/g-C_3N_4$ nanocomposite, preferably 190.5 to 209.5 F/g, preferably 191 to 209 F/g, preferably 191.5 to 208.5 F/g, preferably 192 to 208 F/g, preferably 192.5 to 207.5 F/g, preferably 193 to 207 F/g, preferably 193.5 to 206.5 F/g, preferably 194 to 206 F/g, preferably 194.5 to 205.5 F/g, preferably 200 F/g at a scan rate of 1 millivolts per second (mV/s). In some embodiments, the working electrode has a specific capacity of 155 to 175 F/g of the $CaV_2O_6/CaSiO_3/g-C_3N_4$ nanocomposite, preferably 155.5 to 174.5 F/g, preferably 156 to 174 F/g, preferably 156.5 to 173.5 F/g, preferably 157 to 173 F/g, preferably 157.5 to 172.5 F/g, preferably 158 to 172 F/g, preferably 158.5 to 171.5 F/g, preferably 159 to 171 F/g, preferably 159.5 to 170.5 F/g, preferably 166.3 F/g at a scan rate of 0.25 mV/s.

In some embodiments, the working electrode has an energy density of 20 to 25 watt-hour per gram (Wh/g) of the $CaV_2O_6/CaSiO_3/g-C_3N_4$ nanocomposite, preferably 20.5 to 24.5 Wh/g, preferably 21 to 24 Wh/g, preferably 21.5 to 23.5 Wh/g, preferably 22 to 23.4 Wh/g, preferably 23.1 Wh/g. In some embodiments, the working electrode has a power density of 200 to 220 watts per kilogram (W/kg) of the $CaV_2O_6/CaSiO_3/g-C_3N_4$ nanocomposite, preferably 200.5 to 219.5 W/kg, preferably 201 to 219 W/kg, preferably 201.5 to 218.5 W/kg, preferably 202 to 218 W/kg, preferably 202.5 to 217.5 W/kg, preferably 203 to 217 W/kg, preferably 203.5 to 216.5 W/kg, preferably 204 to 216 W/kg, preferably 204.5 to 215.5 W/kg, preferably 205 to 215 W/kg, preferably 205.5 to 214.5 W/kg, preferably 206 to 214 W/kg, preferably 206.5 to 213.5 W/kg, preferably 207 to 213 W/kg, preferably 207.5 to 212.5 W/kg, preferably 208 W/Kg. In some embodiments, the working electrode has a solution resistance of 20 to 30 ohm ($\Omega$), preferably 21 to 29$\Omega$, preferably 22 to 28$\Omega$, preferably 23 to 27$\Omega$, preferably 24 to 26.5$\Omega$, preferably 26$\Omega$.

In some embodiments, the working electrode has a charge transfer resistance of 900 to 1000$\Omega$, preferably 905 to 995$\Omega$, preferably 910 to 990$\Omega$, preferably 915 to 985$\Omega$, preferably 920 to 980$\Omega$, preferably 925 to 975$\Omega$, preferably 930 to 970$\Omega$, preferably 935 to 965$\Omega$, preferably 940 to 960$\Omega$, preferably 945 to 955$\Omega$, preferably 946$\Omega$. In some embodiments, the working electrode has a conductivity of 0.030 to 0.035 milli siemens per square centimetre ($mS/cm^2$), preferably 0.031 to 0.034 $mS/cm^2$, preferably 0.032 to 0.033 $mS/cm^2$, 0.033 $mS/cm^2$. In some embodiments, the working electrode has a time constant of 0.011 to 0.013 milliseconds (ms), preferably 0.0115 to 0.0125 ms, preferably 0.012 ms. In some embodiments, the working electrode has at least 80%, preferably 80.8% of the capacity retention after 1000 cycles.

In some embodiments, the electrochemical device further includes drying the $CaV_2O_6/CaSiO_3/g-C_3N_4$ nanocomposite, binder, and black carbon mixture on the fluorine-doped tin oxide electrode at 150 to 250° C., preferably 151 to 248° C., preferably 152 to 247° C., preferably 153 to 246° C., preferably 154 to 245° C., preferably 155 to 244° C., preferably 156 to 243° C., preferably 157 to 242° C., preferably 158 to 241° C., preferably 159 to 240° C., preferably 160 to 239° C., preferably 161 to 238° C., preferably 162 to 237° C., preferably 163 to 236° C., preferably 164 to 235° C., preferably 165 to 234° C., preferably 166 to 233° C., preferably 167 to 232° C., preferably 168 to 231° C., preferably 169 to 230° C., preferably 170 to 229° C., preferably 171 to 228° C., preferably 172 to 227° C., preferably 173 to 226° C., preferably 174 to 225° C., preferably 175 to 224° C., preferably 176 to 223° C., preferably 177 to 222° C., preferably 178 to 221° C., preferably 179 to 220° C., preferably 180 to 219° C., preferably 181 to 218° C., preferably 182 to 217° C., preferably 183 to 216° C., preferably 184 to 215° C., preferably 185 to 214° C., preferably 186 to 213° C., preferably 187 to 212° C., preferably 188 to 211° C., preferably 189 to 210° C., preferably 190 to 209° C., preferably 191 to 208° C., preferably 192 to 207° C., preferably 193 to 206° C., preferably 194 to 205° C., preferably 195 to 204° C., preferably 196 to 203° C., preferably 197 to 202° C., preferably 198 to 201° C., preferably 200° C. for 1-5 hours, preferably 1.5 to 4.5 hours, preferably 2 to 4 hours, preferably 2.5 to 3.5 hours, preferably 2.8 to 3.2 hours, preferably 3 hours. In some embodiments, the drying may be performed by using heating appliances such as ovens, microwaves, autoclaves, hot plates, heating mantles and tapes, oil baths, salt baths, sand baths, air baths, hot-tube furnaces, and hot-air guns.

In some embodiments, the $CaV_2O_6/CaSiO_3/g-C_3N_4$ nanocomposite, binder, and black carbon mixture is in an amount of 10 to 30 $mg/cm^2$ of the fluorine-doped tin oxide electrode, preferably 11 to 29 $mg/cm^2$, preferably 12 to 28 $mg/cm^2$, preferably 13 to 27 $mg/cm^2$, preferably 14 to 26 $mg/cm^2$, preferably 15 to 25 $mg/cm^2$, preferably 16 to 24 $mg/cm^2$, preferably 17 to 23 $mg/cm^2$, preferably 18 to 22 $mg/cm^2$, preferably 19 to 21 $mg/cm^2$, preferably 20 $mg/cm^2$ of the fluorine-doped tin oxide electrode.

In some embodiments, a separator may also be present in the electrochemical device. The separator may be selected from a group including polypropylene (PP) membrane, glass fiber, and cellulose fiber. In some embodiments, the separator may include bacterial cellulose fiber, a polyolefin such as polyethylene (PE), or a combination of PP and PE.

In some embodiments, a wearable device may include the electrochemical device. The wearable device may include, but is not limited to, a smart ring, a smartwatch, a smart wristband such as a fitness tracker, augmented reality (AR) headsets, and reality (MR) headsets. The electrochemical device may be electrically connected to a sensor and function as a battery. In some embodiments, two or more electrochemical device may be connected in parallel and/or series. For example, a power bank includes about 2, about 3, about 4, about 5, about 6, about 7, about 8, and about 9 of the electrochemical device connected in parallel and/or series. The power bank includes up to about 10 of the electrochemical device connected in parallel and/or series. The power bank includes 2-10 of the electrochemical device connected in parallel and/or series.

EXAMPLES

The following examples demonstrate an electrochemical device. The examples are provided solely for illustration and are not to be construed as limitations of the present disclosure, as many variations thereof are possible without departing from the spirit and scope of the present disclosure.

Example 1: Fabrication of $CaSiO_3$

Equal moles of calcium nitrate and sodium metasilicate were dispersed in 100 millilitres (ml) of ethanol: water (1:1) in a 150 mL glass beaker and sonicated for 15 min. The mixture was transferred to a 200 mL autoclave and then placed in an oven operated at 180° C. for 2.0 h. The product was dispersed in 500 ml distilled water with an ultrasonic bath for 10 minutes, filtered via a Buchner system, rinsed with distilled water, and dried at 120° C. for 1.0 h.

About 30.0 grams (g) of urea was placed in a 250 mL porcelain crucible, covered with its porcelain cover, then the hall crucible and cover were raped with three layers of aluminium foil to reduce the urea loss of evaporation. The crucible was heated via a furnace set at 600° C. for 45 min.

About 10.0 ammonium metavanadate and 10.0 g of xylose were placed in a 500 mL beaker. 100 ml distilled water was added to the mixture and heated till a clear solution was obtained. 10 mL of concentrated nitric acid was added to the mixture, which was then heated till the carbonization of xylose. The mixture was placed in an oven set at 120° C. for 5.0 h; the black product was milled in a mortar, placed in a 150 mL porcelain dish, and calcined at 550° C. for 3.0 h.

An equal mass of $CaSiO_3$, $g-C_3N_4$, and $V_2O_5$ was transferred to a mono wave-200 vial (G30), dispersed in 20 mL ethylene glycol monomethyl ether via an ultrasonic bath for 30 minutes. The vial was closed with its Teflon cover and placed in the Anton-Baar Monowave-200 operated at 180° C. and 5.0 bar pressure for one hour. The product was dispersed in 1 litre (L) distilled water with an ultrasonic bath for 30 minutes, filtered via a Buchner system, rinsed with distilled water, and dried at 150° C. for 2.0 h.

X-ray diffraction (XRD) was used to identify the crystalline states in each specimen studied, employing the JDX-8030 X-ray, JEOL, made in Japan. Cu-filtered CuKα radiation (1.5418 angstrom (Å)) powered at 45 kilovolts (kV) and 10 milliampere (mA) was used to run the patterns. The specimens were tested at ambient temperatures in a range of 2θ=5 to 80°. The surface morphologies of the obtained samples were analysed by transmission electron microscopy-selected area electron diffraction-high-resolution transmission electron microscopy (TEM-SAED-HRTEM) images obtained using a Tecnai-G20 (USA) transmission electron microscope with a 200 kV speed voltage. $N_2$ adsorption isotherm obtained at 77 kelvin (K) using Micrometrics ASAP 2020 Brünauer-Emmett-Teller (BET) analyser was used to calculate the surface characteristics, specifically the BET surface area, total pore volume (Vp), and mean pore radius (r). Before beginning the measurement, the samples were outgassed for three hours at 200° C. with a decreased pressure of 10–5 Torr. The Shimadzu UV-Vis spectrophotometer (2600i UV-Vis, Japan) was used to record UV-Vis diffuse reflectance spectra (DRS) in the 200-800 nanometres (nm) region, using the typical $BaSO_4$.

Using PGSTAT204 with Nova 1.11 software for data computation, the electrochemical characteristics of the produced nanocomposite were comprehensively investigated at room temperature (RT). Three electrode cells—a platinum counter electrode, the reference electrode, a saturated calomel electrode ($Hg/Hg_2Cl_2$), and the working electrode were employed in the presence of 1.0 molar (M) NaOH as the electrolyte. The generated nanomaterials (85 weight percent) were combined with a 5 weight percent poly (vinylidene fluoride) binder and 10 weight percent black carbon with an initial loading of 20 milligrams per square centimetre ($mg/cm^2$) to create the functioning electrode. A doctor blade was then used to disperse the previously made paste, which was then evenly rolled over the fluorine-doped tin oxide (FTO) glass.

Lastly, the paste that was put on FTO was dried at 200° C. for three hours. Cyclic voltammetry (CVs) was conducted at scan speeds of 1, 5, 10, 20, and 50 millivolts per second ($mV\ s^{-1}$) between 0 and 1 V. With a constant voltage of 10 mV and currents varying from 10 to 100 milliampere (mA), the PGSTAT204 was used to measure the electrochemical impedance in the frequency range of 0.1 hertz (Hz)-140 kilohertz (kHz). The Kramers-Kronig transformation was used to validate the impedance spectra. Galvanostatic charge-discharge and chronopotentiometry were used to calculate the specific capacitance using a Digi-Ivy 2116 B-USA with DY2100B software.

The crystallinity and phases identification present in $CaV_2O_6/CaSiO_3/g-C_3N_4$ catalyst was analysed by XRD and the results are given in FIG. 1. The intense peaks and high intensity values indicate that the powder is highly crystalline in nature. Examination of the diffraction patterns with the standard powder diffraction file (PDF) cards reveals the presence of $CaV_2O_6$ as major phase together with $CaSiO_3$, and $g-C_3N_4$ as minor phases. The $CaV_2O_6$ phase was indexed to the 2θ values of 25.1, 25.9, 27.8, 27.9, 30.1, 36.8, 36.9, 39.7, and 49.6°. These diffractions are, respectively, assigned to (201), (100), (−202), (−111), (111), (−311), (400), (003) and (020) plans of the monoclinic phase of $CaV_2O_6$ (Reference code No. 01-073-0186). The $CaSiO_3$ phase (COD No. 01-072-2284) was detected at 2θ values of 25.2, 30.2, and 41.8°. These diffractions were respectively coming from (002), (120), and (−231). The diffractions related to $g-C_3N_4$ was observed at 45.8, 53.7, 71.8 and 79.40 (COD No. 1534042). Minor traces of $SiO_2$ were detected at 2θ value of 19.3 and 25.1° (Reference code No. 00-049-0629). No other phases were detected indicating the successful fabrication of $CaV_2O_6/CaSiO_3/g-C_3N_4$.

Figure 2A:
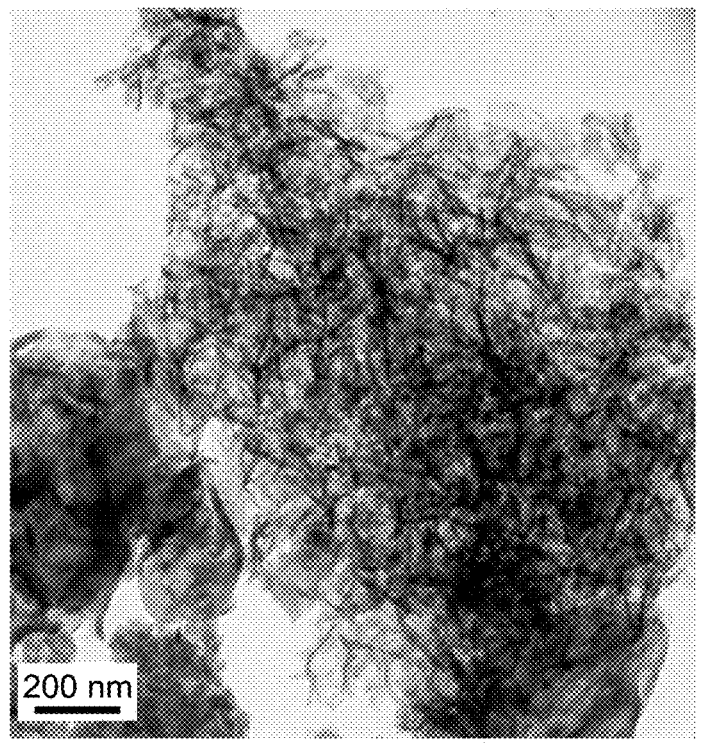
FIG. 2A is a transmission electron microscopy (TEM) image of $CaV_2O_6/CaSiO_3/g-C_3N_4$ nanocomposite, according to certain embodiments.
Figure 2B:
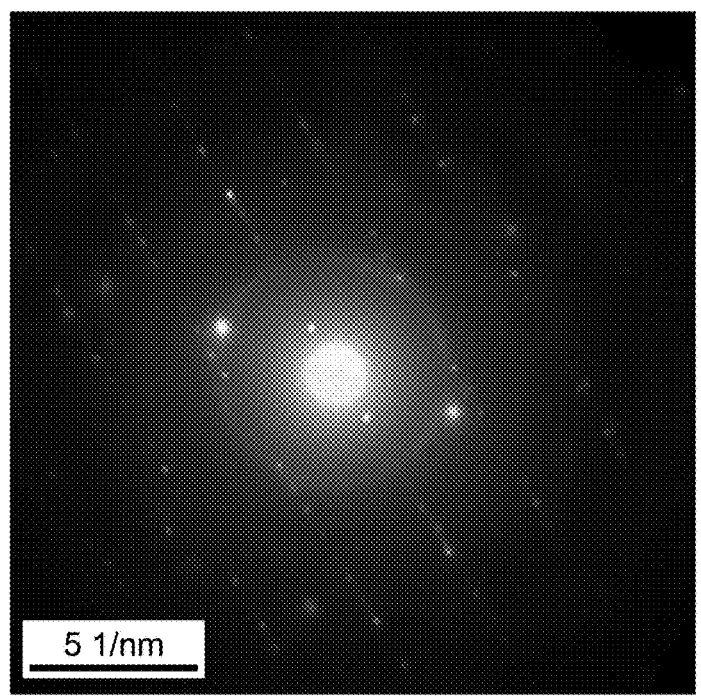
FIG. 2B is a selected area electron diffraction (SAED) image of $CaV_2O_6/CaSiO_3/g-C_3N_4$ nanocomposite, according to certain embodiments.

TEM image of $CaV_2O_6/CaSiO_3/g-C_3N_4$ nanocomposite was presented in FIG. 2A. The TEM image showed that two-dimensional (2D) porous structure constructed with curled and wrinkled nanosheets and platelets of the $g-C_3N_4$ (FIG. 2A). the image shows also well dispersion of homogeneous nanowires of metal oxides with average length 90.6 nm on nanosheets of g-C$_3$N$_4$. The corresponding SAED pattern (FIG. 2B) reveals diffraction spots with interplanar spacing of 0.23 nm, 0.219 nm, 0.17, and 0.146 nm due to (003, CaV$_2$O$_6$, (−231, CaSiO$_3$) and (003, CaV$_2$O$_6$), diffraction planes, respectively as confirmed from XRD data.

Figure 3A:
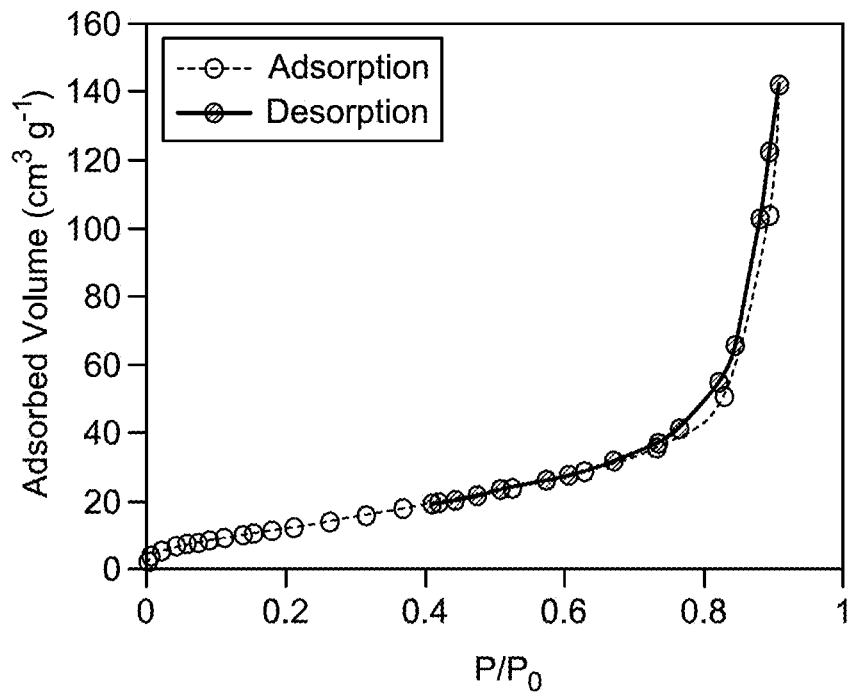
FIG. 3A is a $N_2$ adsorption-desorption isotherm of $CaV_2O_6/CaSiO_3/g-C_3N_4$ nanocomposite, according to certain embodiments.
Figure 3B:
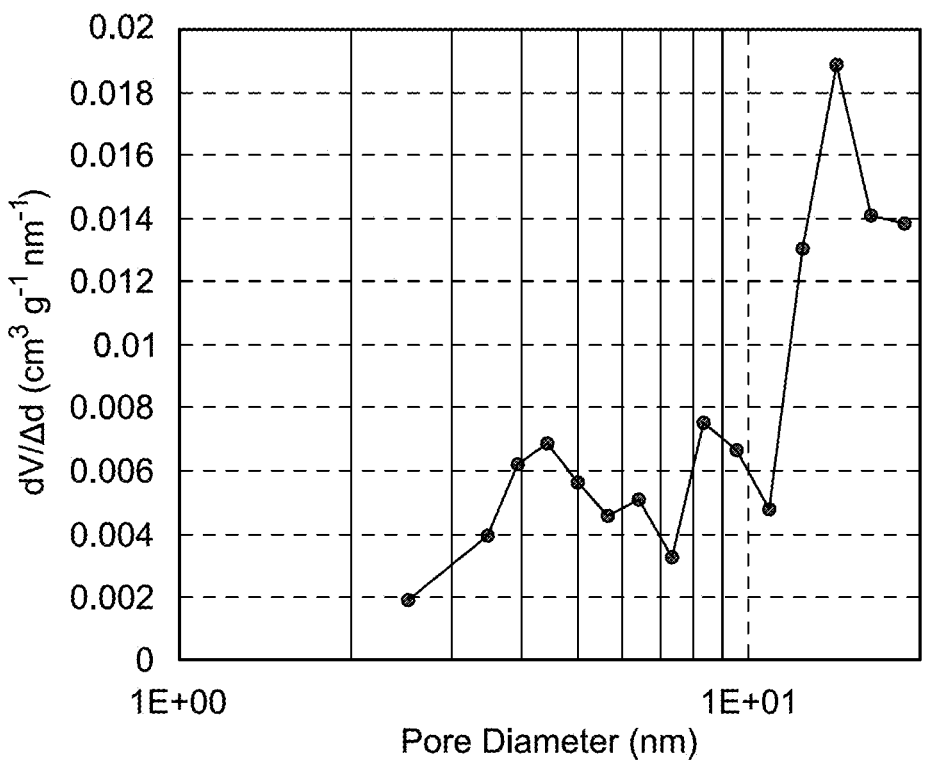
FIG. 3B depicts corresponding pore size distribution of $CaV_2O_6/CaSiO_3/g-C_3N_4$ nanocomposite, according to certain embodiments.

FIG. 3A displays the nitrogen adsorption-desorption isotherm of CaV$_2$O$_6$/CaSiO$_3$/g-C$_3$N$_4$ nanocomposite. The nitrogen sorption isotherm of the composite is belonging to type IV with narrow hysteresis loop, indicating the formation of mesoporous structures. However, shifting the loop to a relatively higher pressure (P/PO=0.73-1) indicates the presence of wide mesopores, which may result from the deposition of metal oxides particles in the wide pores of g-C$_3$N$_4$. Furthermore, the BET surface area of the CaV$_2$O$_6$/CaSiO$_3$/g-C$_3$N$_4$ sample was calculated to be 57.02 m$^2$ g$^{-1}$. The marked high specific surface area reflects the good dispersion of these metal oxides nanoparticles on g-C$_3$N$_4$. and CaSiO$_3$. Moreover, the pore size distribution curves (FIG. 3B), plotted using the Barrett-Joyner-Halenda (BJH) method, for the CaV$_2$O$_6$/CaSiO$_3$/g-C$_3$N$_4$ sample exhibited trimodal distribution with average pore diameters maximized at 4.3, 8.5, and 14.27 nm and pore volume of 0.22 cubic centimetre per gram (cm$^3$ g$^{-1}$). All the isotherms belong to the category H3 type of pores, which do not exhibit limiting adsorption at high P/Po and arise due to aggregation of plate-like particles giving rise to slit-shaped pores. This indicates that the assembly of CaV$_2$O$_6$/CaSiO$_3$/g-C$_3$N$_4$ composite provoked a mesoporous array.

Figure 4:
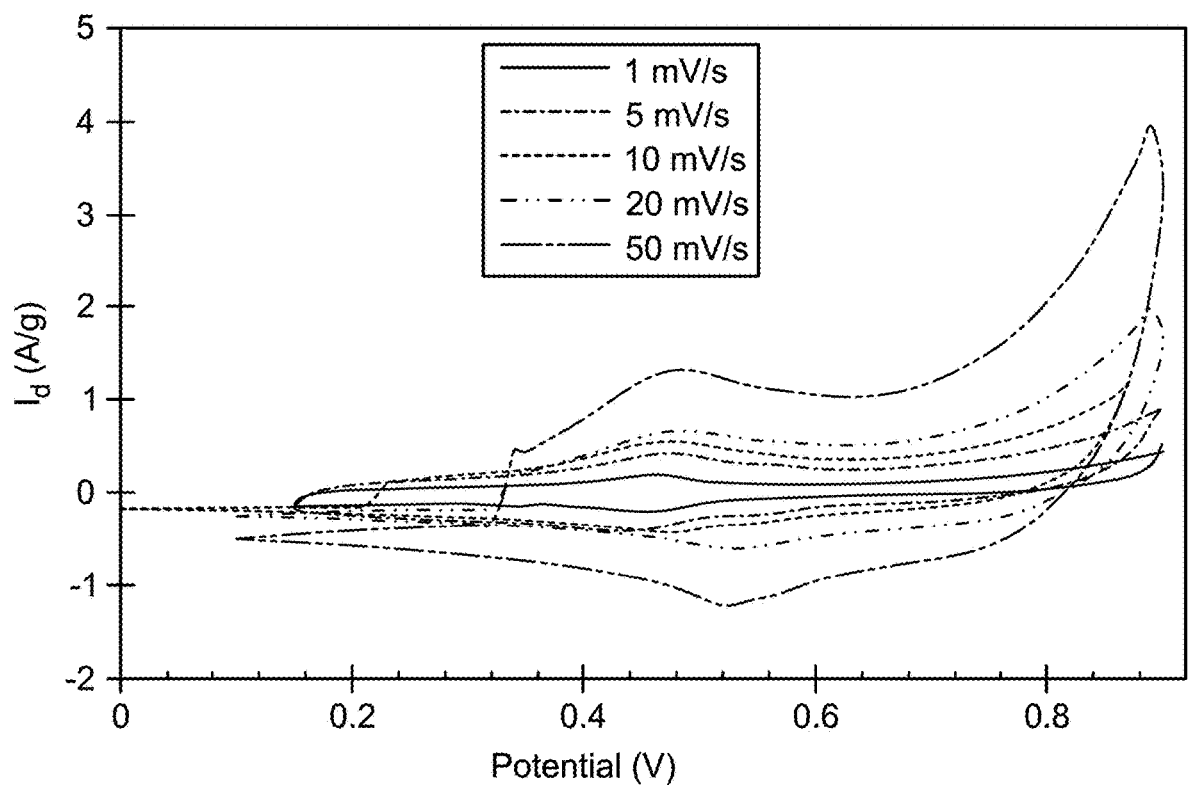
FIG. 4 depicts cyclic voltammetry (CV) curve at different scan rates for $CaV_2O_6/CaSiO_3/g-C_3N_4$ nanocomposite, according to certain embodiments.

The CV plot (FIG. 4) of CaV$_2$O$_6$/CaSiO$_3$/g-C$_3$N$_4$ composite shows a pseudocapacitive behavior with redox peaks at +0.48 V and +0.52 V, corresponding to the V$^{4+}$↔V$^{5+}$ redox composite system [Benmouss M, Outzourhit A, Jourdani R, Bennouna A, Ameziane E L. Structural, optical and electrochromic properties of sol-gel V2O5 thin films. *Active Passive Electron Component.* 2003; 26:245-256, incorporated herein by reference in its entirety].

The specific capacity (C$_{sp}$) for each sample was calculated from the CV data using Eq. (1), [Sayyed S G, Shaikh A V, Dubal D P, Pathan H M. Paving the way towards Mn3O4 based energy storage systems. *ES Energy Environ.* 2021; 14: 3e21, and Mousa M A, Khairy M, Shehab M. Nanostructured ferrite/graphene/polyaniline using for supercapacitor to enhance the capacitive behaviour. *J Solid State Electrochem.* 2017; 21: 995e1005, incorporated herein by reference in its entirety] and the results are summarized in Table 1.

$$C_{sp} = \frac{1}{mv\Delta V}\int_{-V}^{+V} IV\partial V$$

where I is current (A), V is applied potential (V), ν is scan rate (V/s), and m is mass of active material (g).

For further analysis of capacitive behavior, b. was determined through power law using Eq. (2) [Jiang S, Xiang M, Zhang J, Chu S, Marcelli A, Chu W, Wu D, Qian B, Tao S, and Song L, Rational Design of Hierarchical FeSe2 Encapsulated with Bifunctional Carbon Cuboids as Advanced Anode for Sodium-ion Batteries *Nanoscale.* 2020; 12:22210-22216, incorporated herein by reference in its entirety]

$$I=av^b \tag{2}$$

where I is the highest current density in CV plots, and a and b are constant parameters. According to Eq. 3, if the b value is generally=1.0, it refers to surface capacitive. If b=0.5, it refers to diffusion-controlled redox reaction. [Lesel, B.; Ko, J.; Dunn, B.; Tolbert, S. Mesoporous LixMn2O4 Thin Film-Cathodes for Lithium-Ion Pseudocapacitors, *ACS Nano.* 2016; 10:7572-7581, and Chao, D.; Zhu, C.; Yang, P.; Xia, X.; Liu, J.; Wang, J.; Fan, X.; Savilov, S.; Lin, J.; Fan, H.; Shen, Z. Array of nanosheets render ultrafast and high-capacity Na-ion storage by tunable pseudocapacitance. *Nat. Commun.* 2016; 7:12122, incorporated herein by reference in its entirety.]

$$I(V) = k_1 v^{\frac{1}{2}} + k_2 v \tag{3}$$

Solving for the values of k$_1$ and k$_2$ in Eq. (3) at specific potential shows the separation of the diffusion and capacitive currents, respectively. It's noticed from k$_1$, and k$_2$ values, as listed in Table 1, that composite tends to be higher for both diffusive and capacitive currents. This is attributed to the mixed behaviour of electric double-layer capacitor (EDLC), and pseudocapacitive mechanisms of its constituents. [Ma, T.; Zhang, M.; Liu, H.; Wang, Y. Three-dimensional sulfur-doped graphene supported cobalt-molybdenum bimetallic sulfides nanocrystal with highly interfacial storage capability for supercapacitor electrodes. *Electrochimica Acta* 2019; 322:134762, incorporated herein by reference in its entirety.]

Figure 5:
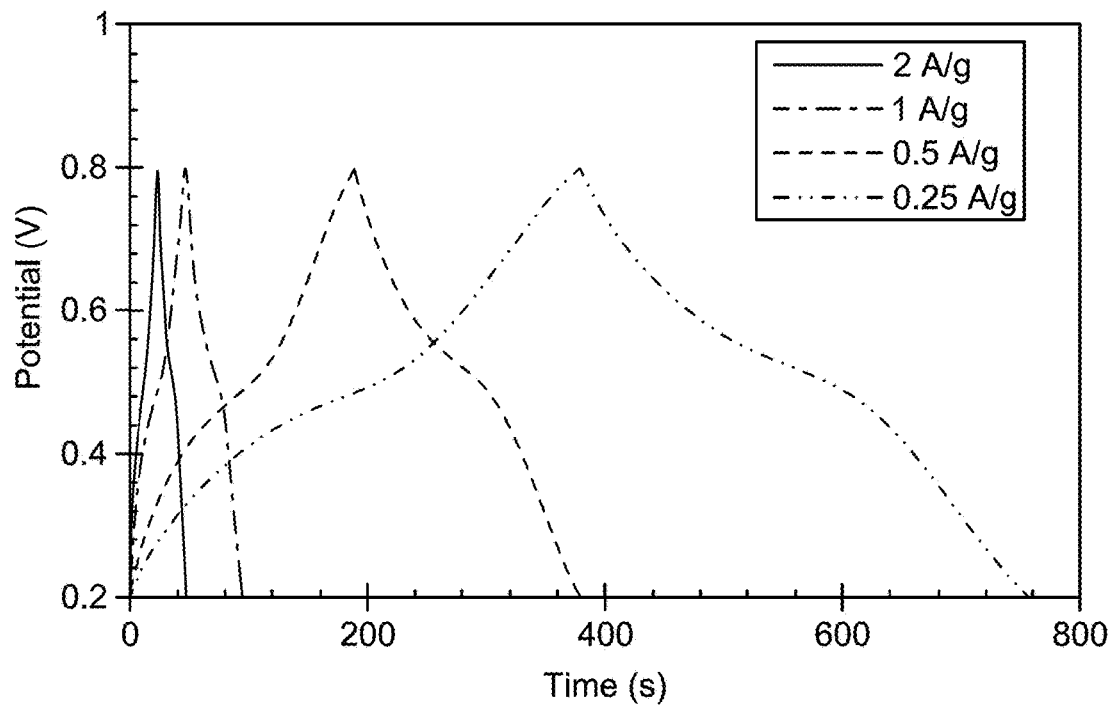
FIG. 5 is a Galvanostatic charge-discharge (GCD) curve at different current densities for $CaV_2O_6/CaSiO_3/g-C_3N_4$ nanocomposite, according to certain embodiments.

The galvanostatic charge-discharge (GCD) method was also used to investigate the electrodes' electrochemical behaviour at a constant current density of 1 ampere per gram (A/g). Results in FIG. 5 demonstrate that samples have a small current resistance (IR) drop. The electrodes' C$_{sp}$ was estimated from the discharge cycle using Eq. 4. [Akbar M Z, Saied SHD. Construction of complex copper cobalt selenide hollow structures as an attractive battery type electrode material for hybrid supercapacitors. Chem. Eng J 2020; 402:126241, and Bahareh A, Akbar M Z, Saied S H D. An advanced hybrid supercapacitor constructed from rugby-ball-like NiCo2Se4 yolk shell nanostructures. *Mater Chem Front* 2021; 5: 4725e38, incorporated herein by reference in its entirety.]

$$C_{sp} = \frac{I\Delta t}{m\Delta V} \tag{4}$$

Where Δt is the discharge time, and ΔV is the potential range. Table 1 demonstrates the results and capacity enhancements.

The energy density (E$_d$) and power density (P$_d$) are important parameters. They are calculated for the prepared composite samples using Eqs. (5, 6), [Mohamed M M, Khairy M, Ahmed A A, Mousa M A, Nonconventional synthesis of polyhedral Mn3O4 nanoarchitectures incorporated reduced graphene oxide: superior supercapacitor capabilities. *J. Mater. Res. Technol.* 2022; 21:2555-2570, incorporated herein by reference in its entirety.] and listed in Table 1

$$E_d = \frac{1}{2} C_{sp} \Delta V^2 \tag{5}$$

$$P_d = \frac{E_d}{t} \tag{6}$$

Figure 6:
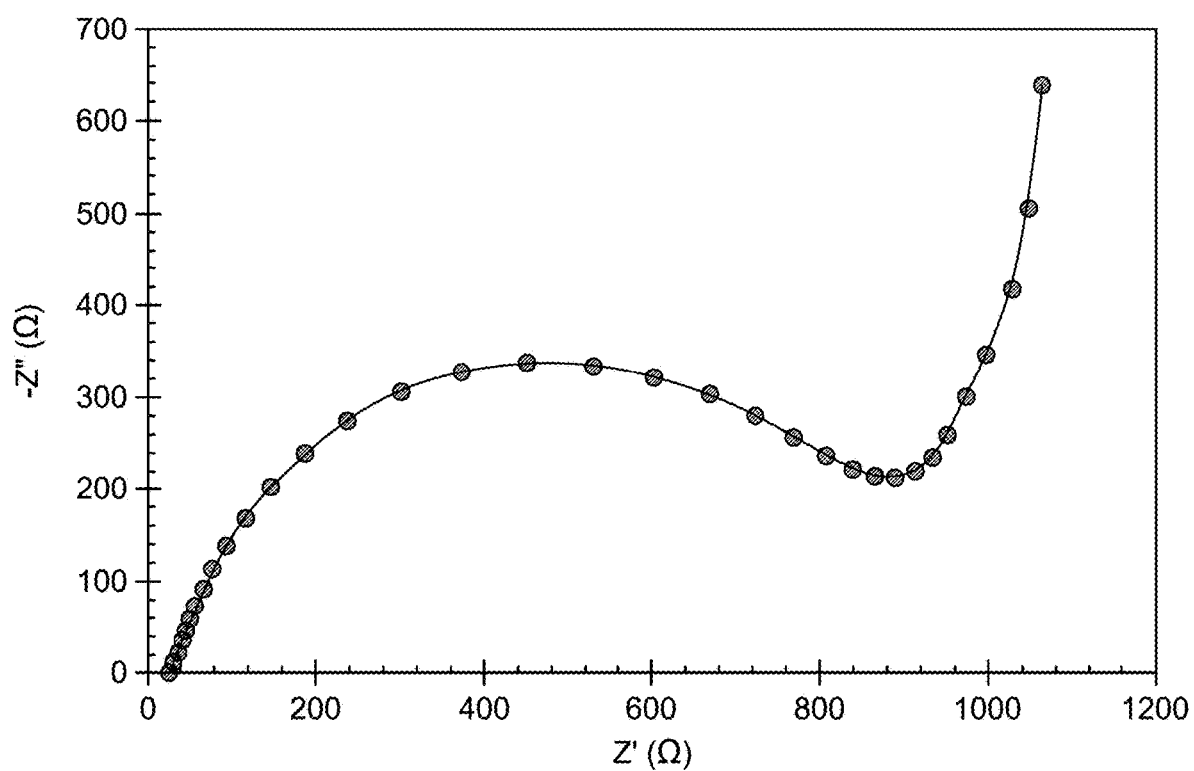
FIG. 6 is an electrochemical impedance spectroscopy (EIS) spectrum of $CaV_2O_6/CaSiO_3/g-C_3N_4$ nanocomposite, according to certain embodiments.

A basic understanding of ion diffusion, bulk electrolyte characteristics, electrode/electrolyte interface behaviour, etc., is provided by an electrochemical impedance spectroscopy (EIS) analysis. The charge-transfer resistance and low-frequency capacitance values in the various recorded frequency regions, as well as their influence on the supercapacitor cells' performance, were investigated using the EIS data. The impedance spectra (Nyquist plots across the $10^{-2}$-$10^5$ Hz range) of every cell under study are displayed in FIG. 6. In the high-frequency domain, this corresponds to a semicircle, while in the low-frequency domain, it nearly forms a vertical line. Crossings of the Z/axis Nyquist diagram indicate the solution resistance ($R_s$) at higher frequencies. The diameter of the semicircle shows the charge transfer resistance ($R_{ct}$) at the electrode/electrolyte interface, which is connected to the surface property of the electrode [Mohamed M M, Khairy M, Ahmed A A, Mousa M A, Nonconventional synthesis of polyhedral Mn3O4 nano-architectures incorporated reduced graphene oxide: superior supercapacitor capabilities. *J. Mater. Res. Technol.* 2022; 21:2555-2570, incorporated herein by reference in its entirety]. The spike at the lower frequencies denotes the supercapacitance behaviour of the samples and represents the diffusive resistance of electrolytes' ions into materials. The fitting data of the EIS spectra are listed in Table 1. The time constant ($\tau$) of prepared electrodes was derived from the frequency ($\omega$) coordinated at the maximum of semicircle using Eq. (7) [Balasubramaniam M, Balakumar S. Exploration of electrochemical properties of zinc antimonate nanoparticles as supercapacitor electrode material. *Mater Sci Semicond Process* 2016; 56: 287e94, incorporated herein by reference in its entirety.]

$$\tau = \frac{1}{\omega} \quad (7)$$

The results are listed in Table 1, which demonstrates that t of composite decreases may be due to g-$C_3N_4$ presence.

For further confirmation of charge storage mechanism, Eq. 8 is applied $$Z = \frac{1}{B(i\omega)^p} \quad (8)$$

where Z is the impedance, B is a constant, $\omega$ is the frequency, and p is a varied value. When p=1, this refers to capacitor behaviour, and when p=0.5, this indicates semi-infinite diffusion of the battery. The results obtained are listed in Table 1, which is almost compatible with b calculated from CV data, which emphasizes and confirms the explanation of the high capacity of $CaV_2O_6$/$CaSiO_3$/g-$C_3N_4$ composite.

Numerous modifications and variations of the present disclosure are possible in light of the above teachings. It is therefore to be understood that within the scope of the appended claims, the invention may be practiced otherwise than as specifically described herein.

The invention claimed is:

1. An electrochemical device, comprising:
a counter electrode, a reference electrode, a working electrode, and an electrolyte,
wherein the working electrode is a fluorine-doped tin oxide electrode with a graphite-phase carbon nitride calcium metavanadate and calcium silicate ($CaV_2O_6$/$CaSiO_3$/g-$C_3N_4$) nanocomposite, a binder, and a black carbon mixture on a surface of the fluorine-doped tin oxide electrode,
wherein the $CaV_2O_6$/$CaSiO_3$/g-$C_3N_4$ nanocomposite comprises a graphite-phase carbon nitride (g-$C_3N_4$) in an amount of 20 to 40 percent by weight (wt. %), a calcium metavanadate ($CaV_2O_6$) in an amount of 20 to 40 wt. %, and a calcium silicate ($CaSiO_3$) in an amount of 20 to 40 wt. % based on a total weight of the $CaV_2O_6$/$CaSiO_3$/g-$C_3N_4$ nanocomposite.

2. The electrochemical device of claim 1, wherein the working electrode comprises 80 to 90 wt % of the $CaV_2O_6$/$CaSiO_3$/g-$C_3N_4$ nanocomposite, 2 to 10 wt % of the binder, and 5 to 15 wt % of the black carbon.

3. The electrochemical device of claim 1, wherein the binder is poly(vinylidene fluoride).

4. The electrochemical device of claim 1, wherein the working electrode has a redox potential of +0.45 to +0.55 V.

5. The electrochemical device of claim 1, wherein the working electrode has a specific capacity of 190 to 210 F/g of the $CaV_2O_6$/$CaSiO_3$/g-$C_3N_4$ nanocomposite at a scan rate of 1 mV/s.

6. The electrochemical device of claim 1, wherein the working electrode has a specific capacity of 155 to 175 F/g of the $CaV_2O_6$/$CaSiO_3$/g-$C_3N_4$ nanocomposite at a scan rate of 0.25 mV/s.

7. The electrochemical device of claim 1, wherein the working electrode has an energy density of 20 to 25 Wh/g of the $CaV_2O_6$/$CaSiO_3$/g-$C_3N_4$ nanocomposite.

8. The electrochemical device of claim 1, wherein the working electrode has a power density of 200 to 220 W/kg of the $CaV_2O_6$/$CaSiO_3$/g-$C_3N_4$ nanocomposite.

9. The electrochemical device of claim 1, wherein the working electrode has a solution resistance of 20 to 30Ω.

10. The electrochemical device of claim 1, wherein the working electrode has a charge transfer resistance of 900 to 1000Ω.

11. The electrochemical device of claim 1, wherein the working electrode has a conductivity of 0.030 to 0.035 mS/cm$^2$.

TABLE 1 electrochemical parameters of $CaV_2O_6$/$CaSiO_3$/g-$C_3N_4$ supercapacitor.

| Sample | $C_{sp}$ (F/g) 1 mV/s | $C_{sp}$ (F/g) 0.25 A/g | b | At 0.4 V $k_1$ (mA) | At 0.4 V $k_2$ (mA) | Stability 1000 cycles (%) | $E_d$ (Wh/g) | $P_d$ (W/kg) | σ (mS/cm$^2$) | p | τ (ms) | $R_s$ (Ω) | $R_{ct}$ (Ω) |
|---|---|---|---|---|---|---|---|---|---|---|---|---|---|
| $CaV_2O_6$/$CaSiO_3$/g-$C_3N_4$ | 200 | 166.3 | 0.51 | 0.6 | 0.05 | 80.8 | 23.1 | 208 | 0.033 | 0.56 | 0.012 | 26 | 946 |

12. The electrochemical device of claim 1, wherein the working electrode has a time constant of 0.011 to 0.013 ms.

13. The electrochemical device of claim 1, wherein the working electrode has at least 80% of the capacity retention after 1000 cycles.

14. The electrochemical device of claim 1, wherein the $CaV_2O_6/CaSiO_3/g-C_3N_4$ nanocomposite comprises a graphite-phase carbon nitride ($g-C_3N_4$) in an amount of 25 to 35 percent by weight (wt. %), calcium metavanadate ($CaV_2O_6$) in an amount of 25 to 35 wt. %, and a calcium silicate ($CaSiO_3$) in an amount of 25 to 35 wt. % based on a total weight of the $CaV_2O_6/CaSiO_3/g-C_3N_4$ nanocomposite.

15. The electrochemical device of claim 1, wherein the counter electrode is at least one selected from the group consisting of platinum, gold, and graphite.

16. The electrochemical device of claim 1, wherein the reference electrode is at least one selected from the group consisting of standard hydrogen electrode, silver/silver chloride electrode (Ag/AgCl), and saturated calomel electrode ($Hg/Hg_2Cl_2$).

17. The electrochemical device of claim 1, wherein the electrolyte is a salt solution, comprising:
    at least one cation selected from the group of sodium, potassium, calcium, magnesium, and
    at least one anion selected from the group of hydroxide, chloride, phosphate, and bicarbonate.

18. The electrochemical device of claim 1, wherein the working electrode is obtained by:
    heating the $CaV_2O_6/CaSiO_3/g-C_3N_4$ nanocomposite, binder, and black carbon mixture on the fluorine-doped tin oxide electrode at a temperature of 150 to 250° C. for 1 to 5 hours.

19. The electrochemical device of claim 1, wherein the working electrode comprises a mixture of the $CaV_2O_6/CaSiO_3/g-C_3N_4$ nanocomposite, binder, and black carbon at a mass loading of 10 to 30 mg/cm² on the fluorine-doped tin oxide electrode.

* * * * *